United States Patent
Teran et al.

(10) Patent No.: US 8,484,184 B2
(45) Date of Patent: *Jul. 9, 2013

(54) NAVIGATION ASSISTANCE FOR SEARCH ENGINES

(75) Inventors: Carlos Teran, San Francisco, CA (US); Tom Chi, San Francisco, CA (US); Don Chennavasin, Santa Clara, CA (US); Ashley Hall, Menlo Park, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/095,491

(22) Filed: Apr. 27, 2011

(65) Prior Publication Data

US 2011/0202520 A1 Aug. 18, 2011

Related U.S. Application Data

(63) Continuation of application No. 12/324,680, filed on Nov. 26, 2008, now Pat. No. 7,949,647.

(51) Int. Cl.
*G06F 7/00* (2006.01)
*G06F 17/30* (2006.01)

(52) U.S. Cl.
USPC .................. 707/706; 707/78; 707/722

(58) Field of Classification Search
USPC .................. 707/708, 706, 709, 722, 769, 771
See application file for complete search history.

(56) References Cited

U.S. PATENT DOCUMENTS

| | | | |
|---|---|---|---|
| 6,092,100 A | 7/2000 | Berstis et al. | |
| 6,377,965 B1 | 4/2002 | Hachamovitch et al. | |
| 6,411,950 B1 | 6/2002 | Moricz et al. | |
| 6,480,843 B2 | 11/2002 | Li | |
| 6,564,213 B1 | 5/2003 | Ortega et al. | |
| 6,675,159 B1 | 1/2004 | Lin et al. | |
| 6,772,150 B1 | 8/2004 | Whitman et al. | |
| 6,862,710 B1 | 3/2005 | Marchisio | |

(Continued)

FOREIGN PATENT DOCUMENTS

| | | |
|---|---|---|
| WO | 2008032037 A1 | 3/2008 |
| WO | 2008043645 A1 | 4/2008 |
| WO | 2008069470 A1 | 6/2008 |

OTHER PUBLICATIONS

Liu, "Automatic Query Type Identification Based on Click Through Information", 2006, p. 593-600.*

(Continued)

*Primary Examiner* — Tony Mahmoudi
*Assistant Examiner* — Merilyn Nguyen
(74) *Attorney, Agent, or Firm* — Dentons US LLP

(57) ABSTRACT

Search assistance is provided to users that submit search queries to search engines. In one implementation, a partial search query input by a user to a search engine is received. The partial search query is predicted to be a navigational query. A web address is selected based on the predicted navigational query. A search assistance list that includes the selected web address is generated. The search assistance list is displayed to the user in response to the received partial search query. In another implementation, a plurality of suggested search queries is determined for the received partial search query. A suggested search query of the plurality of suggested search queries having a highest relevance to the user is determined. A search assistance list is generated and displayed to the user. The suggested search query having the highest relevance to the user is prominently displayed in the search assistance list.

20 Claims, 12 Drawing Sheets

U.S. PATENT DOCUMENTS

| | | | |
|---|---|---|---|
| 6,862,713 B1 | 3/2005 | Kraft et al. | |
| 6,947,930 B2 | 9/2005 | Anick et al. | |
| 7,051,023 B2 | 5/2006 | Kapur et al. | |
| 7,130,923 B2 | 10/2006 | Mason | |
| 7,240,049 B2 | 7/2007 | Kapur | |
| 7,299,270 B2 | 11/2007 | Kolluri et al. | |
| 7,321,892 B2 | 1/2008 | Vadon et al. | |
| 7,376,752 B1 | 5/2008 | Chudnovsky et al. | |
| 7,383,299 B1 | 6/2008 | Hailpern et al. | |
| 7,499,940 B1 * | 3/2009 | Gibbs | 1/1 |
| 7,647,312 B2 | 1/2010 | Dai | |
| 7,672,932 B2 | 3/2010 | Hood et al. | |
| 7,836,058 B2 | 11/2010 | Chellapilla et al. | |
| 7,840,589 B1 * | 11/2010 | Holt et al. | 707/769 |
| 7,844,599 B2 * | 11/2010 | Kasperski et al. | 707/713 |
| 7,949,647 B2 | 5/2011 | Teran et al. | |
| 8,005,832 B2 * | 8/2011 | Andrieu | 707/731 |
| 8,185,529 B2 * | 5/2012 | Forstall et al. | 707/736 |
| 8,229,914 B2 * | 7/2012 | Ramer et al. | 707/709 |
| 2003/0041147 A1 | 2/2003 | van den Oord et al. | |
| 2003/0135507 A1 | 7/2003 | Hind et al. | |
| 2005/0149507 A1 | 7/2005 | Nye | |
| 2005/0203878 A1 | 9/2005 | Brill et al. | |
| 2005/0283468 A1 | 12/2005 | Kamvar et al. | |
| 2006/0206454 A1 | 9/2006 | Forstall et al. | |
| 2006/0282575 A1 | 12/2006 | Schultz | |
| 2007/0011161 A1 | 1/2007 | Norton et al. | |
| 2007/0055652 A1 | 3/2007 | Hood et al. | |
| 2007/0156636 A1 | 7/2007 | Norton et al. | |
| 2007/0208714 A1 | 9/2007 | Ture | |
| 2008/0040323 A1 | 2/2008 | Joshi | |
| 2008/0066017 A1 | 3/2008 | Hall | |
| 2008/0109401 A1 | 5/2008 | Sareen et al. | |
| 2008/0109752 A1 | 5/2008 | Bayley et al. | |
| 2008/0120276 A1 | 5/2008 | Chennavasin | |
| 2009/0132529 A1 | 5/2009 | Gibbs | |
| 2009/0228353 A1 | 9/2009 | Achan et al. | |
| 2009/0248667 A1 | 10/2009 | Zheng et al. | |
| 2009/0299964 A1 | 12/2009 | Cameron et al. | |
| 2009/0327260 A1 | 12/2009 | Li et al. | |
| 2010/0131902 A1 | 5/2010 | Teran et al. | |

OTHER PUBLICATIONS

Sullivan, "Google's Search History Expands, Becomes Web History", http://searchengineland.com/070419-181618.php, (Apr. 19, 2007), 26 pages.

Lee, et al., "Mining navigation behaviors for term suggestion of search engines", Journal of information science and engineering, 2007, vol. 23, No. 2; ISSN 1016-2364; http://cat.inist.fr/?aModele=afficheN&cpsidt=18607675, (2007), pp. 387-401.

Cutts, "Changes in URL Queries", downloaded from <http://www.mattcutts.com/blog/changes-in-url-queries/>, (Sep. 18, 2006), 30 pages.

Lee, et al., "Automatic Identification of User Goals in Web Search", ACM, (2005).

Liu, et al., "Automatic Query Type Identification Based on Click Through Information", Springer-Verlag, (2006).

Teevan, et al., "Information Re-Retrieval", ACM Repeat Queries in Yahoo's Logs, (2007).

* cited by examiner

NAVIGATION ASSISTANCE FOR SEARCH ENGINES

This application is a continuation of U.S. application Ser. No. 12/324,680, filed on Nov. 26, 2008, now U.S. Pat. No. 7,949,647, which is incorporated by reference herein in its entirety.

BACKGROUND OF THE INVENTION

1. Field of the Invention

The present invention relates to the providing of search assistance to users that submit queries to search engines.

2. Background

A search engine is an information retrieval system designed to help users find information stored on a computer system. Search engines help to minimize the amount of time required to find information as well as the amount of information that must be reviewed by a user of the search engine. The most public, visible form of a search engine is an Internet search engine that searches for information on the World Wide Web.

A conventional Internet search engine is configured to receive a user query in the form of one or more search terms and to identify relevant web pages based on the query. The user typically enters the query into a search query entry box. A list of the identified web pages, typically ordered from most relevant to least relevant, is then presented to the user via the user's web browser.

When using a search engine to identify web pages relevant to a topic, it is important for the user to determine query terms that will result in web pages of interest to be identified. Some search engines are configured to suggest search queries to the user. For instance, a search engine may be configured to suggest search queries to the user based on the query the user is entering in the search query entry box. As the user types characters into the search query entry box, the search engine receives the characters, and generates a list of suggested search queries based on the received characters. The list of suggested search queries is displayed to the user. For example, if the user types the characters "yah" in the search query entry box, the search engine may suggest the following search queries to the user: "yahoo," "yahoo mail," "yahoo messenger," "yahoo games," and "yahoo chat." As a result, the user may select one of the suggested search queries to have the search engine perform a search on the selected query rather than having to complete typing of the query in the search query entry box. The search engine will typically return a search results page that lists search results for the selected suggested search query. The user may browse any documents listed in the search results page if any of the documents are of interest to the user.

However, while such a search query suggestion configuration may provide some search assistance to the user, the user still must navigate through multiple web pages associated with the search engine before being enabled to browse any documents of interest, resulting in wasted time and effort by the user.

BRIEF SUMMARY OF THE INVENTION

Search assistance is provided to users that submit search queries to search engines. In one implementation, a prediction is made whether a user is submitting a navigational query to a search engine. If the user is predicted to be entering a navigational query, a web page address is provided to the user that is associated with the navigational query. The user can select the web page address to navigate directly to the corresponding web page rather than completing submission of the query. In another implementation, suggested search queries are generated for a query being submitted by the user to the search engine. A suggested search query of most relevance to the user is selected from the suggested search queries, and is provided to the user in a prominent location in a list of the suggested search queries.

In one method implementation, a partial search query input by a user to a search engine is received. The received partial search query is predicted to be a navigational query. A web address is selected based on the predicted navigational query. A search assistance list that includes the selected web address is generated. The search assistance list is displayed to the user in response to the received partial search query.

In another example implementation, a system for providing search assistance includes a suggested search manager and a navigational query determiner. The suggested search manager and navigational query determiner are configured to receive a partial search query input by a user to a search engine. The navigational query determiner is configured to predict whether the received partial search query is a navigational query, and if the received partial search query is predicted to be a navigational query, to select a web address based on the navigational query. The suggested search manager is configured to generate a search assistance list that includes the selected web address. The search assistance list is enabled to be displayed to the user in response to the received partial search query.

In another method implementation, a partial search query input by a user to a search engine is received. A plurality of suggested search queries is determined for the received partial search query. A suggested search query of the plurality of suggested search queries having a greatest relevance to the user is determined. A search assistance list that includes the plurality of suggested search queries is generated. The search assistance list is enabled to be displayed to the user in response to the received partial search query, with the determined suggested search query enabled to be displayed as the first suggested search query in the displayed search assistance list.

In another example implementation, a system for providing search assistance includes a suggested search manager and a suggested search query selector. The suggested search manager is configured to receive a partial search query input by a user to a search engine, and to determine a plurality of suggested search queries for the received partial search query. The suggested search query selector is configured to determine a suggested search query of the plurality of suggested search queries having a greatest relevance to the user. The suggested search manager is configured to generate a search assistance list that includes the plurality of suggested search queries, and to enable the search assistance list to be displayed to the user in response to the received partial search query. The determined suggested search query may be enabled to be displayed as the first suggested search query in the displayed search assistance list or in other prominent location.

Computer program products are also described herein. The computer program products include a computer-readable medium having computer program logic recorded thereon for enabling a processing unit to provide search assistance as described herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE
DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
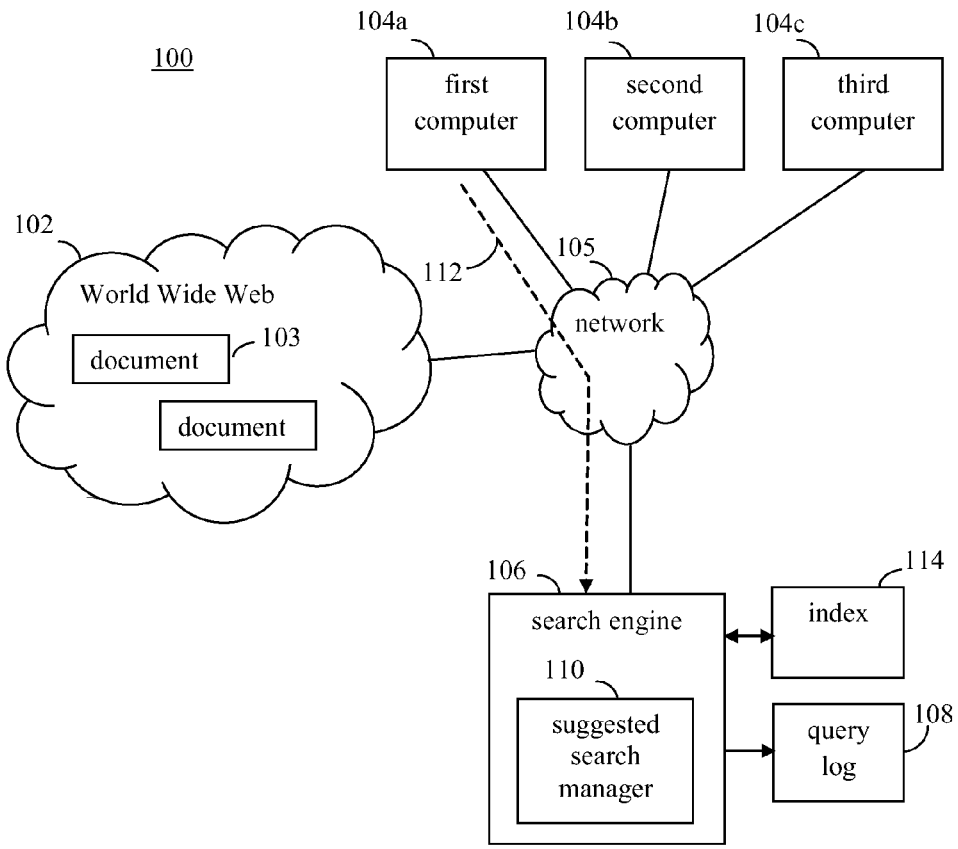
FIG. 1 shows a block diagram of an information retrieval system in which embodiments of the present invention may be implemented.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

Embodiments are described herein for providing search assistance. Such embodiments may be incorporated in web-based or other online search systems. For instance, FIG. 1 shows a block diagram of an information retrieval system 100 in which search assistance may be implemented. System 100 is described herein for illustrative purposes only, and it is noted that embodiments of the present invention may be implemented in alternative environments.

As shown in FIG. 1, system 100 includes a search engine 106. One or more computers 104, such as first computer 104a, second computer 104b and third computer 104c, are connected to a communication network 105. Network 105 may be any type of communication network, such as a local area network (LAN), a wide area network (WAN), or a combination of communication networks. In embodiments, network 105 may include the Internet and/or an intranet. Computers 104 can retrieve documents from entities over network 105. In embodiments where network 105 includes the Internet, a collection of documents, including a document 103, which form a portion of World Wide Web 102, are available for retrieval by computers 104 through network 105. On the Internet, documents may be identified/located by a uniform resource locator (URL), such as http://www.yahoo.com, and/or by other mechanisms. Computers 104 can access document 103 through network 105 by supplying a URL corresponding to document 103 to a document server (not shown in FIG. 1).

Search engine 106 processes downloaded web content (e.g., web pages and further documents obtained from World Wide Web 102 by a web crawler) to generate an index 114, which is configured to index the downloaded documents of World Wide Web 102. Search engine 106 generates index 114 such that rapid and accurate information retrieval with regard to the downloaded documents may be performed by referencing index 114. Index 114 may be configured in any suitable manner, as would be known to persons skilled in the relevant art(s).

Search engine 106 is coupled to network 105. A user of computer 104a who desires to retrieve one or more documents relevant to a particular topic, but does not know the identifier/location of such a document, may submit a query 112 to search engine 106 through network 105. Search engine 106 receives query 112, and analyzes index 114 to identify documents relevant to query 112. For example, search engine 106 may identify a set of documents indexed by index 114 that include terms of query 112. The set of documents may include any number of documents, including tens, hundreds, thousands, or even millions of documents. Search engine 106 may use a ranking or relevance function to rank documents of the retrieved set of documents in an order of relevance to the user. Documents of the set determined to most likely be relevant may be provided at the top of a list of the returned documents in an attempt to avoid the user having to parse through the entire set of documents.

The list of the returned documents may be provided to a user in the context of a document termed a "search results page." As is known to persons skilled in the relevant art(s), a search results page may include user interface elements, such as hypertext links, associated with each returned document. In one implementation, responsive to the activation of such a user interface element (e.g., clicking on a hyperlink) by a user, search engine 106 will cause the returned document associated with the user interface element to be presented to the user. The presentation may involve the delivery of the document from a document server (not shown in FIG. 1) to any one of user computers 104a-104c.

Search engine 106 may be implemented in hardware, software, firmware, or any combination thereof. For example, search engine 106 may include software/firmware that executes in one or more processors of one or more computer systems, such as one or more servers. Examples of search engine 106 that are accessible through network 105 include, but are not limited to, Yahoo! Search™ (at http://www.yahoo.com), Ask.com™ (at http://www.ask.com), and Google™ (at http://www.google.com).

Figure 2:
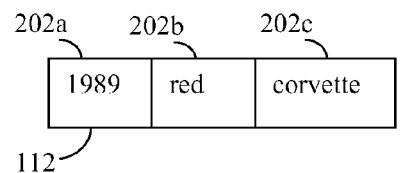
FIG. 2 shows an example query that may be submitted by a user of a computer to a search engine.

FIG. 2 shows an example query 112 that may be submitted by a user of one of computers 104a-104c of FIG. 1 to search engine 106. As shown in FIG. 2, query 112 includes one or more terms 202, such as first term 202a, second term 202b and third term 202c. Any number of terms 202 may be present in a query. As shown in FIG. 2, terms 202a, 202b and 202c of query 112 are "1989," "red," and "corvette," respectively. Search engine 106 applies these terms 202a-202c to index 114 to retrieve a document locator, such as a URL, for one or more indexed documents that match "1989," "red," and "corvette," and may order the list of documents according to a ranking.

As also shown in FIG. 1, search engine 106 may generate a query log 108. Query log 108 is a record of searches that are made using search engine 106. Query log 108 may include a list of queries, by listing query terms (e.g., terms 202 of query 112) along with further information/attributes for each query, such as a list of documents resulting from the query, a list/indication of documents in the list that were selected/clicked on ("clicked") by a user reviewing the list, a ranking of clicked documents, a timestamp indicating when the query is received by search engine 106, an IP (internet protocol) address identifying a unique device (e.g., a computer, cell phone, etc.) from which the query terms were submitted, an identifier associated with a user who submits the query terms (e.g., a user identifier in a web browser cookie), and/or further information/attributes.

Figure 3:
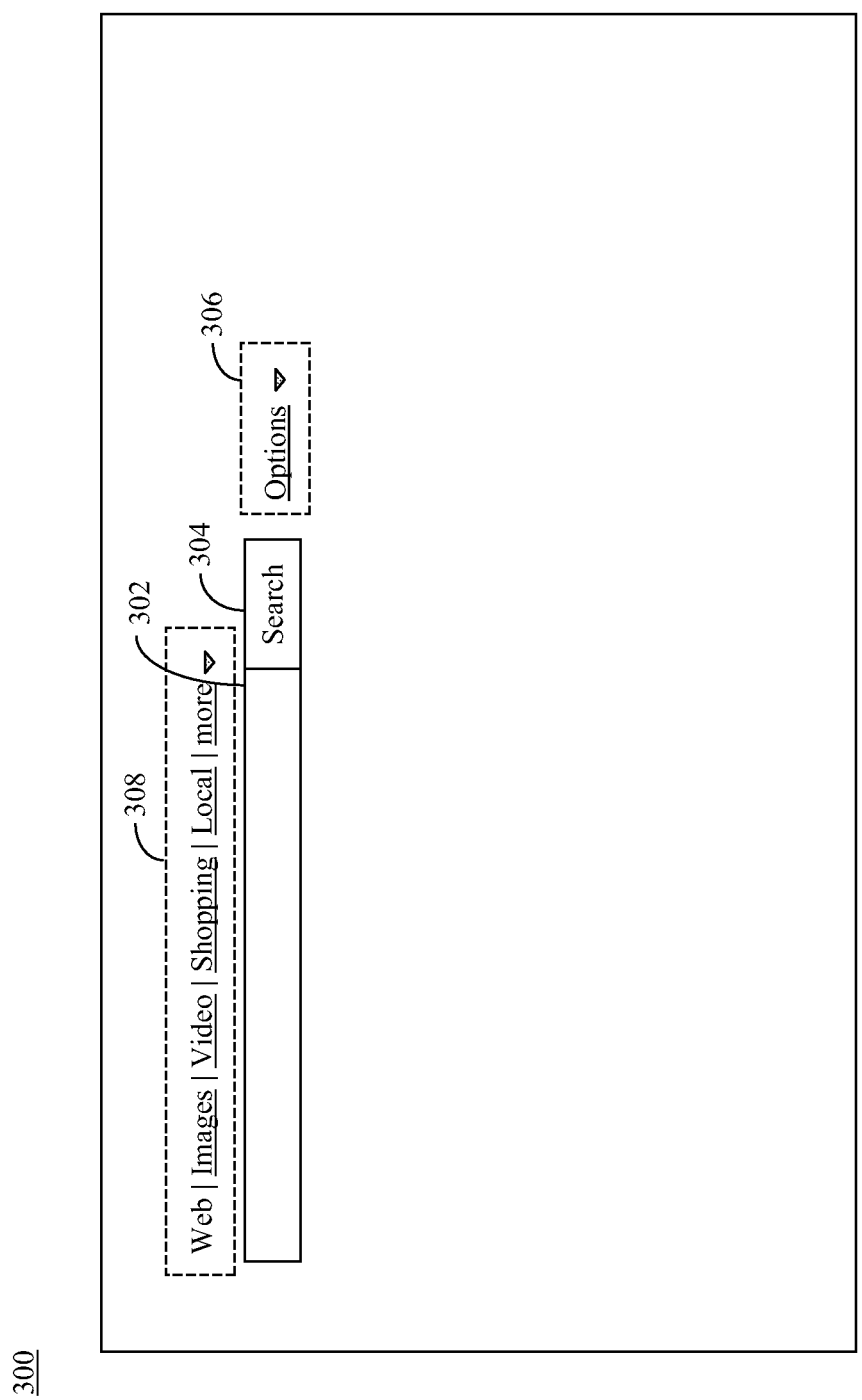
FIG. 3 shows a web page that is an example interface provided by a search engine for performing a search.

FIG. 3 shows a web page 300 that is an example interface for performing a search using a search engine. For instance, web page 300 may be displayed to a user by a web browser included in any of computers 104a-104c shown in FIG. 1. As shown in FIG. 3, web page 300 includes a data entry box 302, a search button 304, and an options button 306. Data entry box 302 defines a user-editable area into which one or more search query terms may be entered. Search button 304 is an interface element that, when activated by a user, causes search engine 106 (FIG. 1) to execute a document search based on the query term(s) entered in data entry box 302. In response to the executed document search, search engine 106 transmits a search results page to the computer of the user, which is displayed to the user (e.g., by a web browser). The search results page provides a listing of search results documents typically in the form of links. Any number of documents may be listed, including thousands or even millions of documents. Typically, search engine 106 orders the list so that documents determined by search engine 106 to likely be most relevant to the user are listed at the top of the list. The user may review any number of the listed documents, and may attempt to interact with any of them by clicking on the corresponding link.

Options button 306 may be selected by the user to enable some optional search features, such as advanced search features, preferences, etc. In the example of FIG. 3, web page 300 also includes a links section 308, which provides optional links that may be interacted with by the user to perform specific types of search related to a current search query term entered in data entry box 302. For instance, as shown in FIG. 3, links section 308 includes a Web link, an Images link, a Video link, a Shopping link, a Local link, and a more link. Options button 306 and links section 308 are optional, and are not necessarily present.

Referring back to FIG. 1, search engine 106 may include a suggested search manager 110. Suggested search manager 110 is configured to suggest search queries to the user. Suggested search manager 110 may be implemented in hardware, software, firmware, or any combination thereof. For example, suggested search manager 110 may include software/firmware that executes in one or more processors of one or more computer systems, such as one or more servers.

Figure 4:
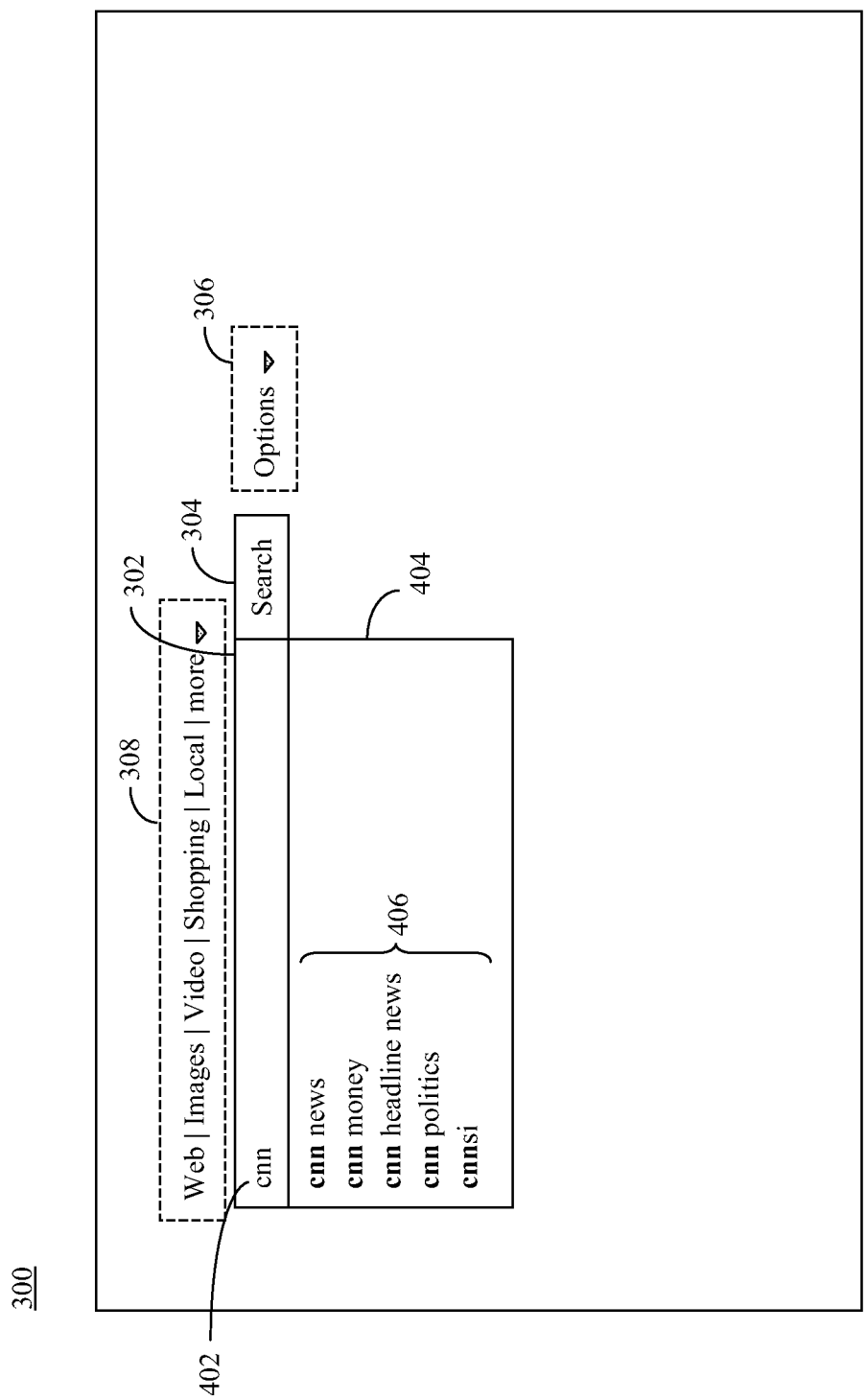
FIG. 4 shows the web page of FIG. 3, where a user has entered characters into a search query entry box, and a suggested search drop down window is displayed.

Referring to FIG. 3, suggested search manager 110 may be configured to suggest search queries to the user based on a query the user is entering into entry box 302. For example, FIG. 4 shows web page 300 of FIG. 3, where the user has entered the characters "cnn" into entry box 302. The characters "cnn" are shown in FIG. 4 for illustrative purposes to represent an example query (or portion of a query) that may be submitted to search engine 106 to identify documents, and are not intended to be limiting.

As the user types characters into entry box 302, suggested search manager 110 of search engine 106 receives the characters, and generates a list 406 of suggested search queries based on the received characters. Characters typed into entry box 302 are transmitted to search engine 106 through network 105 (FIG. 1). List 406 is generated by suggested search manager 110, and is transmitted by search engine 106 to the computer (e.g., one of computers 104a-104c), to be displayed to the user. For example, as shown in FIG. 4, list 406 may be displayed to the user in web page 300 in a drop down window 404. Drop down window 404 is a graphical interface window that drops down from entry box 302. In the example of FIG. 4, window 404 displays the suggested search queries of "cnn news," "cnn money," "cnn headline news," "cnn politics," and "cnnsi" for the entered characters of "cnn." Typically, the suggested search queries are ordered according to a ranking of their respective popularity to the general population of users of search engine 106. Although five example suggested search queries are shown in FIG. 4, any number of suggested search queries may be displayed. List 406 may begin being generated by suggested search manager 110 after a suitable number of characters is/are entered into entry box 402, including one character, two characters, three characters, or further numbers of characters. After list 406 is first generated, list 406 may be updated by suggested search manager 110 for each additional character entered into entry box 302, or for other edits to the query.

As shown in FIG. 4, list 406 is displayed to the user. As a result, rather than having to complete typing of the query in entry box 302, the user may select one of the suggested search queries in list 406 to request that search engine 106 perform a search on the selected suggested search query. Search engine 106 receives the selected suggested search query through network 105 from the computer of the user. Search engine 106 generates a search results page based on the selected suggested search query, and transmits the search results page to the computer of the user through network 105. The user may browse any documents (e.g., web pages) listed in the search results page if any of the web pages are deemed of interest to the user.

However, while such a search query suggestion configuration may provide some search assistance to the user, the user still must navigate through multiple web pages, including web page 300 and at least one search results page, before actually being enabled to browse any web pages of interest. This results in wasted time and effort by the user. Embodiments of the present invention help overcome at least some of these deficiencies, enabling the user to navigate through fewer web pages when performing a search. Example embodiments are described in the following section.

II. Example Embodiments for Providing Search Assistance

Embodiments of the present invention enable search assistance for users entering queries into search engines. In an embodiment, as the user submits characters of a query to a search engine, a prediction is made about whether the user is submitting a navigational query. A navigational query is a type of search query where the user intends to navigate to a particular domain or website, including intending to navigate to a root URL such as www.yahoo.com or www.cnn.com, or to a web page accessible through the root URL, such as http://www.cnn.com/POLITICS/or http://www.cnn.com/2008/POLITICS/10/17/schroeder.buffett/index.html. If it is predicted that the user is submitting a navigational query, a website corresponding to the navigational query is suggested to the user. The user can select the suggested website to navigate directly to the website, rather than completing submission of the query to the search engine, or rather than selecting a suggested search query. Such an embodiment enables users to save time and effort when performing searches intended to find domains.

In another embodiment, as the user submits characters of a query to a search engine, a suggested search query may be identified based on a search history of the user. The suggested search query is a suggested search query that is determined to be of high relevance to the user. The suggested search query may be displayed to the user at the top of the list of suggested search queries or at other prominent location. This suggested search query may be selected by the user to be submitted to the search engine, rather than completing the submission of the query to the search engine. In this manner, a suggested search query is generated that is based on a search history of the user, rather than being based on the search habits of the general population, and thus may be of higher interest to the user.

Figure 5:
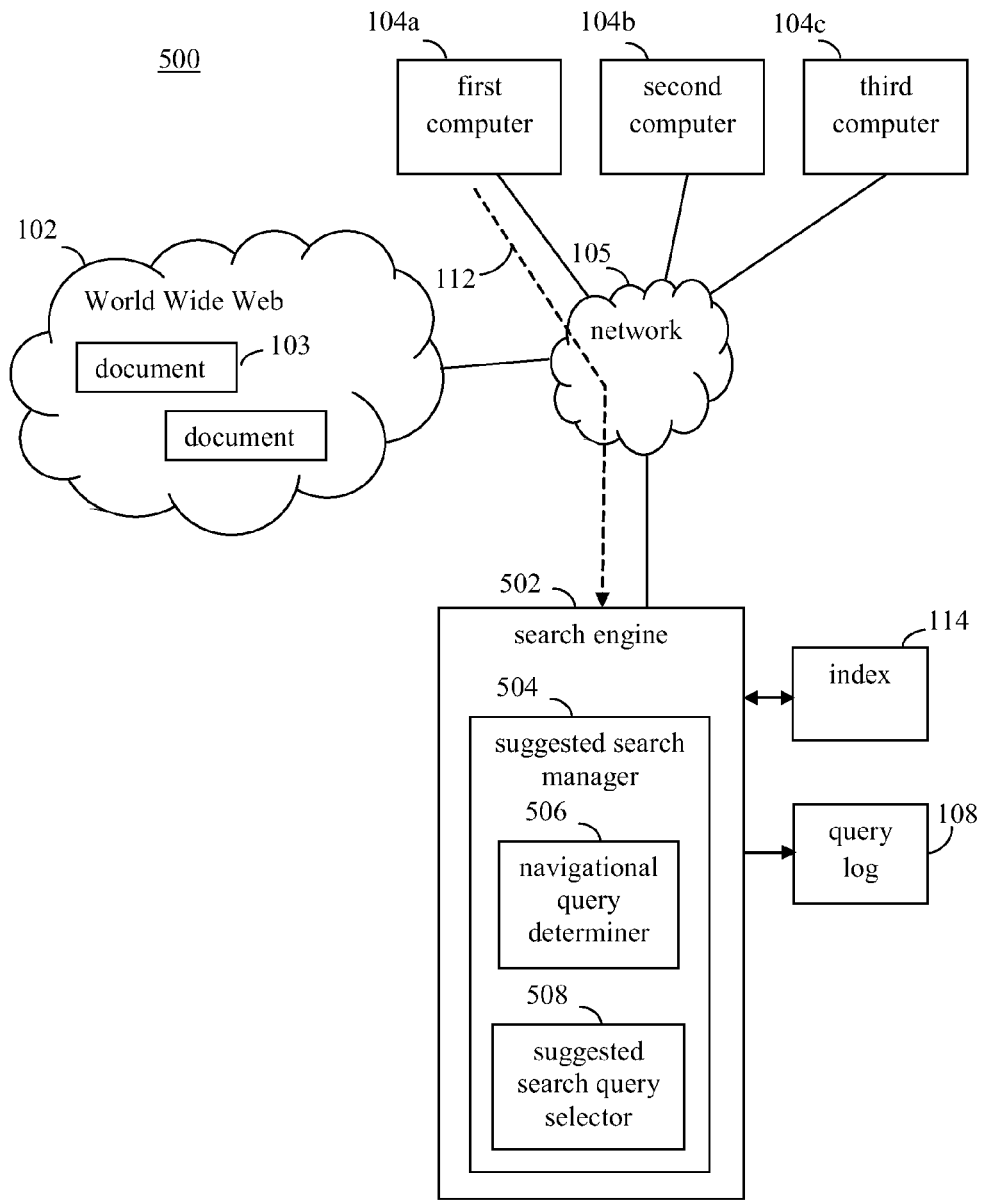
FIG. 5 shows a block diagram of an information retrieval system configured to provide search assistance, according to an example embodiment of the present invention.

In embodiments, either or both of the suggested website (based on a predicted navigational query) and the suggested search query (based on a search history of the user) may be presented to the user in a suggested search list. For instance, in an embodiment, it may first be determined whether a received query is a navigational query. If the received query is determined to be a navigational query, the suggested website may be determined and provided to the user. If the received query is not determined to be a navigational query, the suggested search query may be generated and provided to the user FIG. 5 shows a block diagram of an information retrieval system 500, according to an example embodiment of the present invention. System 500 is configured to provide assistance to users that are performing searches. System 500 is similar to system 100 shown in FIG. 1, with differences described below. As shown in FIG. 5, system 500 includes first-third computers 104a-104c, network 105, and a search engine 502. As described above, network 105 may include the Internet, such that a collection of documents, including a document 103, which form a portion of World Wide Web 102, are available for retrieval by computers 104 through network 105. Users of first-third computers 104a-104c may input search queries to search engine 502 that are transmitted through network 105, such as query 112. Search engine 502 receives query 112, and analyzes index 114 to identify documents relevant to query 112. A search results page that lists the identified documents may be generated by search engine 502, and transmitted to the requesting computer 104 through network 105.

Search engine 502 is similar to search engine 106 shown in FIG. 1, with differences described below. Search engine 502 may be implemented in hardware, software, firmware, or any combination thereof. For example, search engine 502 may include software/firmware that executes in one or more processors of one or more computer systems, such as one or more servers. In another embodiment, search engine 502 may be implemented in hardware logic.

As shown in FIG. 5, search engine 502 includes a suggested search manager 504. Suggested search manager 504 is similar to suggested search manager 110 shown in FIG. 1, with differences described below. Suggested search manager 504 may be configured to suggest search queries to the user based on a query the user is entering into a search query entry box. For example, suggested search manager 504 may generate a list of suggested search queries based on characters entered by a user into a search query entry box, and may transmit the list of suggested search queries to the computer of the user for display to the user. The user may select one of the suggested search queries to have search engine 502 perform a search using the suggested search query, rather than completing entering the query into the search query entry box and submitting the query to search engine 502.

Suggested search manager 504 may be implemented in hardware, software, firmware, or any combination thereof. For example, suggested search manager 504 may include software/firmware that executes in one or more processors of one or more computer systems, such as one or more servers. In another embodiment, suggested search manager 504 may be implemented in hardware logic.

As shown in FIG. 5, suggested search manager 504 includes a navigational query determiner 506 and a suggested search query selector 508. Navigational query determiner 506 is configured to predict whether received characters of a search query (e.g., a partially or completely received search query) indicate that a navigational query is being received. If the received search query is predicted to be a navigational query, navigational query determiner 506 is configured to select a web address based on the navigational query to provide to the user. Suggested search query selector 508 is configured to determine a suggested search query having a highest relevance to the user (e.g., having a higher number of clicks by the user as compared to other suggested search queries).

Either or both of navigational query determiner 506 and suggested search query selector 508 may be present in search engine 502, in embodiments. Navigational query determiner 506 and suggested search query selector 508 may be implemented in hardware, software, firmware, or any combination thereof. For example, navigational query determiner 506 and/or suggested search query selector 508 may include software/firmware that executes in one or more processors of one or more computer systems, such as one or more servers. In another embodiment, navigational query determiner 506 and/or suggested search query selector 508 may be implemented in hardware logic. Example embodiments for navigational query determiner 506 and suggested search query selector 508 are described in the following subsections.

A. Example Navigational Query Determiner Embodiments

Figure 6:
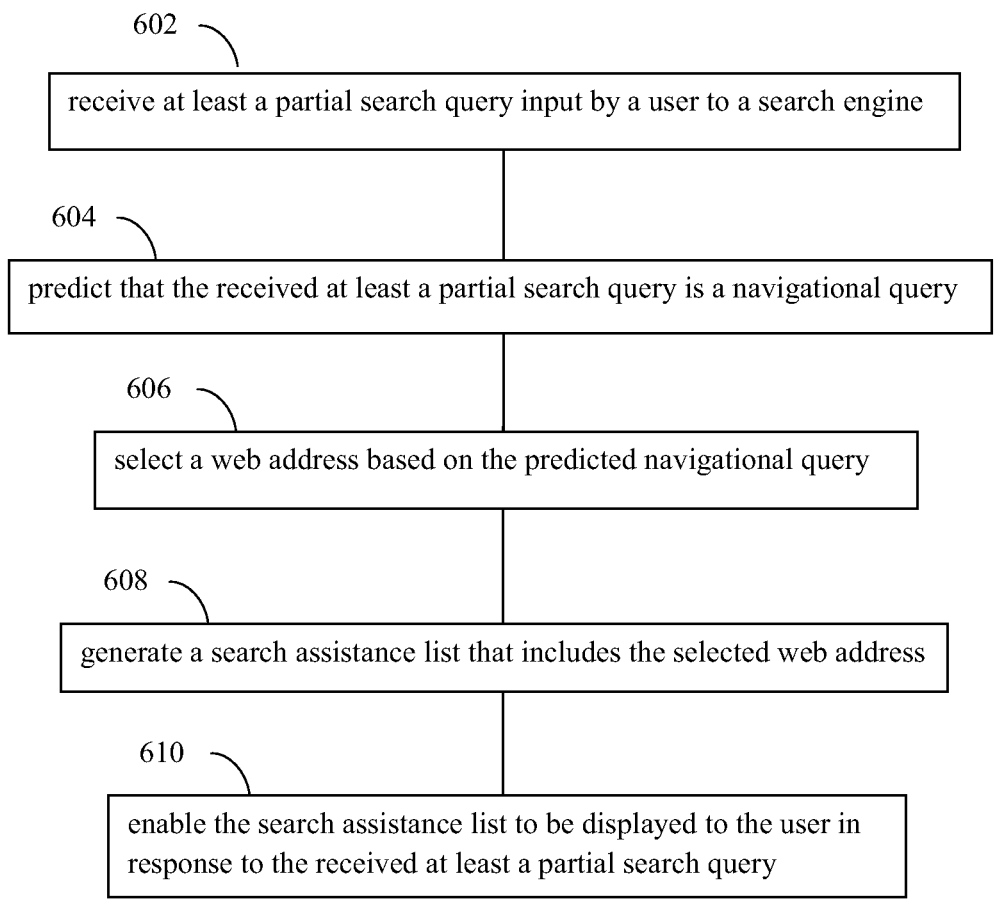
FIG. 6 shows a flowchart for providing search assistance, according to an example embodiment of the present invention.

Navigational query determiner 506 may be implemented in various ways to perform its functions. For instance, FIG. 6 shows a flowchart 600 for providing search assistance, according to an embodiment of the present invention. Flowchart 600 may be performed by navigational query determiner 506, for example. Further structural and operational embodiments will be apparent to persons skilled in the relevant art(s) based on the discussion regarding flowchart 600. For illustrative purposes, flowchart 600 is described with reference to FIG. 7, which shows a portion of system 500 of FIG. 5. Flowchart 600 is described as follows.

Figure 7:
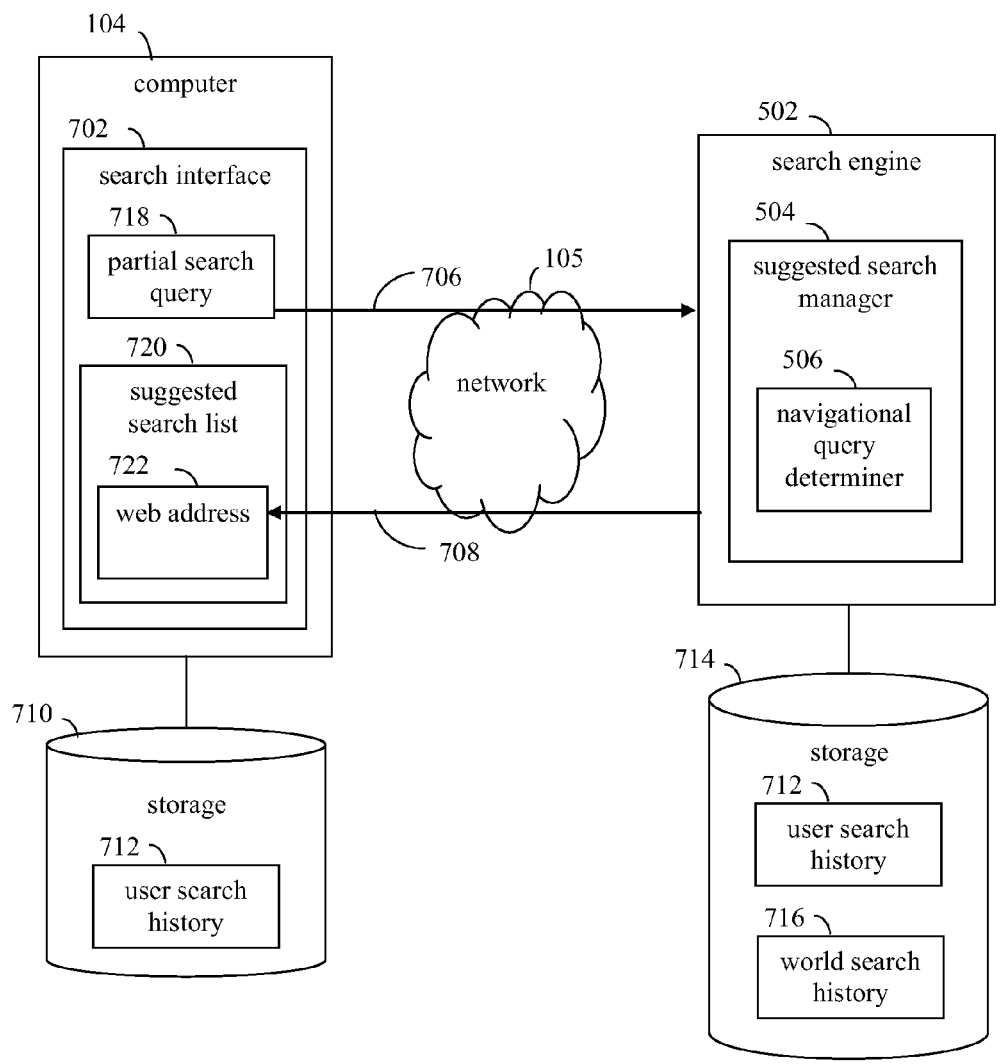
FIG. 7 shows a portion of the system of FIG. 5, where a navigational query is processed, according to an example embodiment of the present invention.

Flowchart 600 begins with step 602. In step 602, at least a partial search query input by a user to a search engine is received. For example, as shown in FIG. 7, a partial search query 718 is input by a user into a search interface 702 at computer 104. Computer 104 may be one of computers 104a-104c shown in FIG. 5, or any other computer coupled to network 105. Search interface 702 may be a web page (e.g., web page 300 of FIG. 3), a web browser search engine tool bar plug-in, or any other type of interface for enabling search engine queries to be received. Partial search query 718 may include any number of one or more characters of a search query being entered by the user into an entry box of search interface 702. As shown in FIG. 7, partial search query 718 is transmitted from search interface 702 by computer 104 to search engine 502 through network 105 in a first communication signal 706, and is received by suggested search manager 504. In an embodiment, each time the user enters a character or otherwise edits/modifies partial search query 718, partial search query 718 may be retransmitted to search engine 502 from search interface 702 as edited/modified, and subsequent steps of flowchart 600 may be performed/re-performed by suggested search manager 504 and navigational query determiner 506, as described herein.

In step 604, the received at least a partial search query is predicted to be a navigational query. As shown in FIG. 7, search engine 502 receives first communication signal 706, which includes partial search query 718. Navigational query determiner 506 is configured to predict whether partial search query 718 corresponds to a navigational query (e.g., is a portion of a navigational query, or is an entire navigational query). Navigational query determiner 506 may be configured to predict whether partial search query 718 corresponds to a navigational query in a variety of ways. For instance, navigational query determiner 506 may compare partial search query 718 to a search query history to determine whether the one or more characters of partial search query 718 corresponds to a prior navigational query entered by one or more users.

For example, the user may enter the characters "ya" into search interface 702 as partial search query 718 (prior to completing entering an entire search query. A search query history may list a previously used search query of "yahoo." When "yahoo" is entered as a search query, the search history may indicate that www.yahoo.com is frequently clicked in a resulting search results page. Thus, "yahoo" may be considered a navigational query associated with www.yahoo.com. Navigational query determiner 506 may be configured to predict that if "ya" is entered by the user, that "ya" is a portion of the navigational query of "yahoo" being entered by the user, and that the user intends to navigate to www.yahoo.com.

In embodiments, navigational query determiner 506 may be configured to predict that the characters entered as partial search query 718 correspond to a navigational query in one or more ways. For example, in an embodiment, navigational query determiner 506 may be configured to determine whether the characters of partial search query 718 match the leading characters of a navigational search query in a search history (e.g., a partial search query of "ya" matches leading characters of a navigational query of "yahoo" in the search history). In another embodiment, navigational query determiner 506 may be configured to determine whether the characters of partial search query 718 match the leading characters of any word of a multi-word navigational search query in a search history (e.g., a partial search query of "so" matches a navigational query of "williams sonoma" in the search history), which is also known as a tokenized prefix match procedure. In another embodiment, navigational query determiner 506 may be configured to determine whether space-separated characters of partial search query 718 match the leading characters of multiple words of a navigational search query in a search history (e.g., a partial search query of "w so" matches a navigational query of "williams sonoma" in the search history). In further embodiments, navigational query determiner 506 may be configured in further ways to predict whether characters entered as partial search query 718 correspond to a navigational query.

In embodiments, the search query history may be any suitable type of search history, and may be located in any suitable location. For example, in an embodiment, the search query history may be a search query history of the user. In another embodiment, the search query history may be a search query history of a population of users. For instance, as shown in FIG. 7, in an embodiment, computer 104 may be coupled to a storage 710. Storage 710 may include one or more storage devices, such as a hard disc drive, optical disc drive, a memory device, and/or other storage device. As shown in FIG. 7, storage 710 may include a user search history 712. User search history 712 includes information regarding searches performed by a user of computer 104. In an embodiment, computer 104 may store in user search history 712 each search query entered by the user, the corresponding search results returned to computer 104 by search engine 502, and the resulting clicks.

In such an embodiment, user search history 712 may be stored local to computer 104. Alternatively, as shown in FIG. 7, in an embodiment, search engine 502 may be coupled to a storage 714. Similarly to storage 710, storage 714 may include one or more storage devices, such as a hard disc drive, optical disc drive, a memory device, and/or other storage device. As shown in FIG. 7, storage 714 may include user search history 712. In such an embodiment, each search query entered by the user at computer 104 and transmitted to search engine 502, and the corresponding search results and clicks, may be stored in user search history 712 in storage 714 by search engine 502. Thus, in an embodiment, user search history 712 may be stored remote from computer 104, such as in storage 714 coupled to search engine 502.

User search history 712 may include various types and quantities of search history related information for the user. For instance, user search history 712 may include a history of search queries entered by the user at computer 104 (e.g., at search interface 702), one or more web pages appearing in the search results for each entered search query that were clicked on by the user, and a number of times each web page was clicked. User search history 712 may have the form of a table, a list, an array, and/or any other data structure. User search history 712 may be stored as a standalone file or group of files, or may be stored in an existing data structure, such as a browser cookie stored for the user, a registry file, or any other file or data structure.

For illustrative purposes, Table 1 shown below shows an example of possible contents of user search history 712:

TABLE 1

| search query | clicked web page | number of clicks |
| --- | --- | --- |
| cnn | www.cnn.com | 8 |
| cnn | sportsillustrated.cnn.com | 1 |
| cnn politics | www.cnn-politics.com | 3 |
| cnn sports | sportsillustrated.cnn.com | 2 |
| shoes | www.zappos.com | 3 |
| shoes | www.payless.com | 2 |
| food | www.wholefoodsmarket.com | 1 |

In the example of Table 1, the user corresponding to user search history 712 had previously entered three search queries of "cnn," "shoes," and "food." In the search results pages for the search query "cnn," the user clicked on the link "www.cnn.com" eight times and the link "sportsillustrated.cnn.com" one time. In the search results pages for the search query "cnn politics," the user clicked on the link "www.cnn-politics.com" three times. In the search results pages for the search query "cnn sports," the user clicked on the link "sportsillustrated.cnn.com" one time. In the search results pages for the search query "shoes," the user clicked on the link "www.zappos.com" three times and the link "www.payless.com" two times. In the search results pages for the search query "food," the user clicked on the link "www.wholefoodsmarket.com" one time. Note that the example of Table 1 includes three search queries for purposes of brevity. In embodiments, user search history 712 may include any number of search queries (and corresponding clicked web pages), including hundreds, thousands, and even further numbers of search queries.

As described above, in another embodiment, the search query history may be a search query history of a population of users. The population of users may be any group of users that does or does not include the user of computer 104. For instance, the population may include all users of search engine 502. As shown in FIG. 7, storage 714 may include a world search history 716. World search history 716 includes a search history for all users that submit search queries to search engine 502. World search history 716 may include various types and quantities of search history related information for the users. For instance, world search history 716 may include information similar to user search history 712 described above. In an embodiment, world search history 716 may include a history of search queries entered by all users to search engine 502, one or more web pages appearing in the search results for each entered search query that were clicked at least once, and a number of times each web page was clicked. World search history 716 may have the form of a table, a list, an array, and/or any other data structure. In an embodiment, world search history 716 may be query log 108 shown in FIG. 1, or may be generated from query log 108. Table 2 shown below shows an example of possible contents of world search history 716, for illustrative purposes:

TABLE 2

| search query | clicked web page | number of clicks |
| --- | --- | --- |
| cnn | www.cnn.com | 1,038,080 |
| cnn | sportsillustrated.cnn.com | 634,083 |
| cnn politics | www.cnn-politics.com | 889,743 |
| cnn sports | sportsillustrated.cnn.com | 442,838 |
| shoes | www.zappos.com | 587,335 |
| shoes | www.payless.com | 398,208 |
| food | www.wholefoodsmarket.com | 239,435 |

Note that the example of Table 2 includes three search queries for purposes of brevity. In embodiments, world search history 716 may include any number of search queries (and corresponding clicked web pages), including hundreds, thousands, millions, and even further numbers of search queries.

As described above, navigational query determiner 506 may compare partial search query 718 to a search query history to determine whether the character combination of partial search query 718 corresponds to a navigational query. The search query history may be user search history 712 stored in storage 710 or storage 714, or may be world search history 716 stored in storage 714. Partial search query 718 may be determined by navigational query determiner 506 to be a navigational query based on the search query history in various ways. For instance, in an embodiment, one or more search queries in a history of search queries (e.g., user search history 712 or world search history 716) that include partial search query 718 are identified by navigational query determiner 506. Partial search query 718 may be determined by navigational query determiner 506 to be a navigational query if a web page associated with a search query of the identified search queries has a number of clicks that is greater than a number of clicks for other web pages associated with the identified search queries by a predetermined amount.

For instance, partial search query 718 may be the characters "cnn." Navigational query determiner 506 may be configured to identify queries in user search history 712 or world search history 716 that include "cnn." Referring to Table 1 for an example of user search history 712, the search queries "cnn," "cnn politics," and "cnn sports" may be identified as including the partial search query of "cnn." As indicated in Table 1, the web page "www.cnn.com" associated with the identified search query "cnn" has the highest number of clicks (8) as compared to the web pages listed in Table 1 for the other identified search queries ("cnn"—sportsillustrated.cnn.com, 1 click; "cnn politics"—www.cnn-politics.com, 3 clicks; and "cnn sports"—sportsillustrated.cnn.com, 2 clicks). Navigational query determiner 506 may be configured to determine that "cnn" is a navigational query if "www.cnn.com" has a number of clicks (8) that is greater than a number of clicks for each of the websites sportsillustrated.cnn.com (1 click), www.cnn-politics.com (3 clicks), and sportsillustrated.cnn.com (2 clicks) by a predetermined amount.

The predetermined amount may be configured in various ways. For example, the predetermined amount may be a number of clicks, such as 4 clicks. If the predetermined amount is 4 clicks, navigational query determiner 506 may determine that "cnn" is a navigational query for "www.cnn.com," because the number of 8 clicks for "www.cnn.com" is greater than the number of clicks for each of sportsillustrated.cnn.com (1 click), www.cnn-politics.com (3 clicks), and sportsillustrated.cnn.com (2 clicks) by 4 or more clicks. If the predetermined amount is 6 clicks, navigational query determiner 506 may determine that a navigational query for the partial search query "cnn" is not present because the number of 8 clicks for "www.cnn.com" is not greater than the number of clicks for www.cnn-politics.com (3 clicks) by 6 or more clicks.

In another embodiment, navigational query determiner 506 may be configured to determine that "cnn" is a navigational query if "www.cnn.com" has a percentage of total clicks for the identified web pages that is greater than a predetermined fraction or percentage, such as 50%. For instance, the total number of clicks of each of the identified web pages may be totaled, which in the present example is 8+1+3+2=14. Navigational query determiner 506 may determine that "cnn" is a navigational query for "www.cnn.com," because the percentage of clicks for "www.cnn.com" (100× 8/14) is 57%, which is greater than 50%. If the predetermined percentage is 75%, navigational query determiner 506 may determine that "cnn" is not a navigational query because the percentage of clicks (57%) for "www.cnn.com" is less than 75%.

In further embodiments, navigational query determiner 506 may be configured to determine whether a search query is a navigational query using further techniques, such as by comparing clicks or click through rates (CTRs) as described above, or further types of CTRs of the web pages associated with the identified search queries, by editorial judgment (e.g., by manual selection), and/or by using further techniques. For example, in another embodiment, a partial search query may be determined to be a navigational query if a web page associated with a search query has a click through rate that is greater than click through rates of other web pages associated with the identified search queries by a predetermined amount.

Furthermore, in an alternative embodiment, navigational query determiner 506 may be configured to analyze world search history 716 to predict a navigational query in a similar manner as described above for user search history 712.

Referring back to flowchart 600 (FIG. 6), in step 606, a web address is selected based on the predicted navigational query. In an embodiment, a web address of the web page associated with the search query determined to be a navigational query is selected by navigational query determiner 506. For instance, in the current example, if "cnn" is predicted to be a navigational query for "www.cnn.com" as described above, then "www.cnn.com" is selected as the web address.

In step 608, a search assistance list is generated that includes the selected web address. As described above with respect to FIG. 4, suggested search manager 110 is configured to generate list 406, which includes one or more suggested search queries based on the received characters of a search query. In a similar manner, suggested search manager 504 may be configured to generate a search assistance list that includes one or more suggested search queries. Furthermore, suggested search manager 504 is configured to include the web address determined in step 606 in the search assistance list.

In step 610, the search assistance list is enabled to be displayed to the user in response to the received at least a partial search query. For example, in an embodiment, the search assistance list (including the web address determined in step 606) may be transmitted to computer 104 from suggested search manager 504 of search engine 502 through network 105 in a second communication signal 708. As shown in FIG. 7, search interface 702 displays a suggested search list 720 (generated in step 608) received in second communication signal 720, which includes a web address 722 (selected in step 606). In an embodiment, each time the user enters a character, or otherwise edits/modifies partial search query 718 at computer 104, partial search query 718 may be transmitted to search engine 502 as edited/modified, and search engine 502 may generate and transmit a revised/modified search assistance list 720 back to computer 104 (e.g., by repeating/re-performing steps 604-610 based on the modified partial search query).

Figure 8:
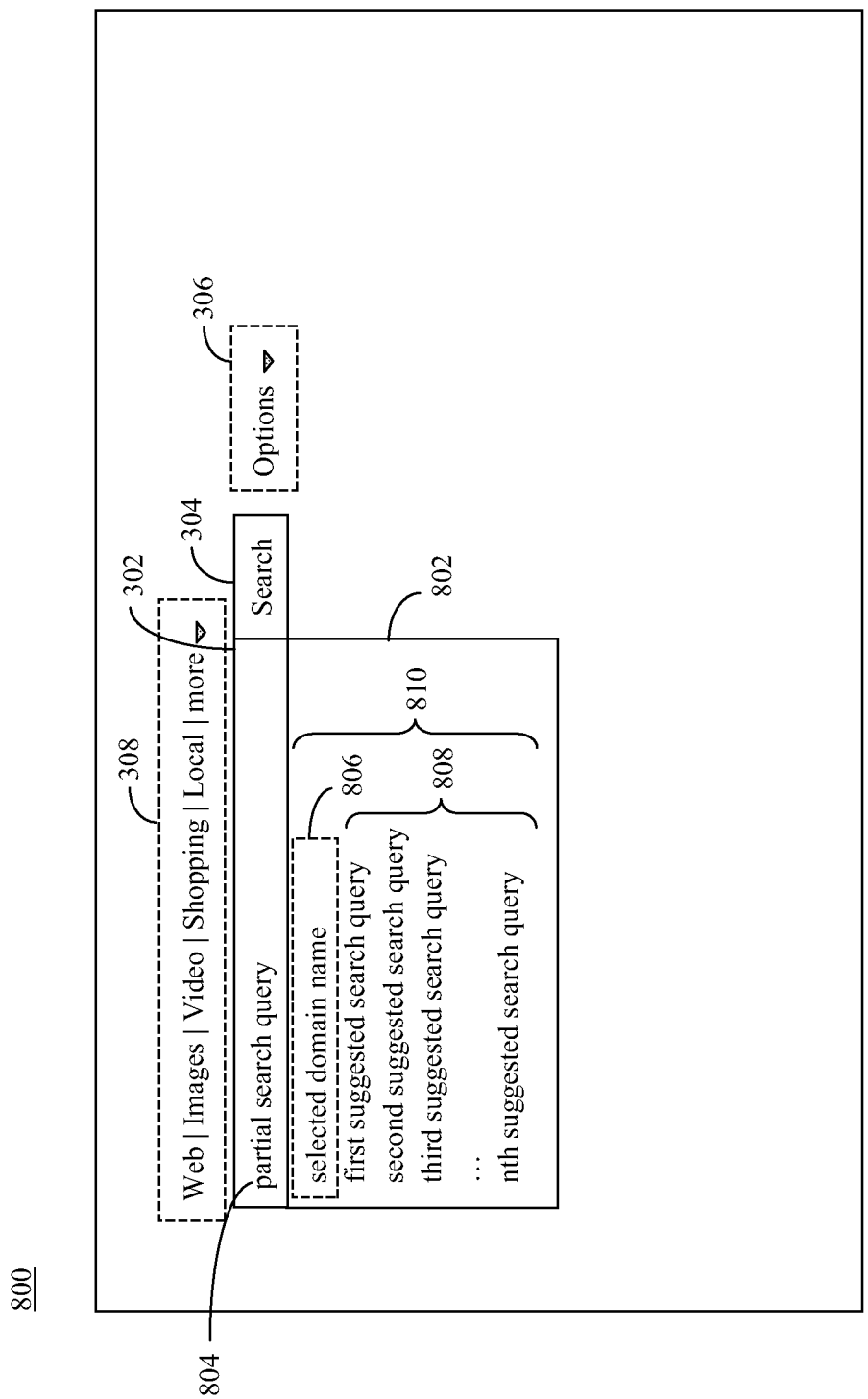
FIG. 8 shows a search interface that includes a search query entry box, and shows a drop down search assistance window, according to an example embodiment of the present invention.

In an embodiment, the search assistance list may be displayed to the user at computer 104. For example, FIG. 8 shows web page 800, where the user has entered partial search query 804 in entry box 302. Web page 800 is an example of search interface 702 shown in FIG. 7. As a result of entering a partial search query 804 into entry box 302, navigational query determiner 506 predicts whether partial search query 804 is a navigational query (in step 604), and if so, generates selected web address 806 (in step 606). Suggested search manager 504 generates a search assistance list 810 that includes selected web address 806 and a list 808 of suggested search queries (in step 608). As shown in FIG. 8, search assistance list 810 is displayed in a drop down window 802, which appears below entry box 302. In an embodiment, partial search query 804 is entered in entry box 302, and search assistant list 810 is displayed in drop down window 802, without refreshing or otherwise modifying web page 800. Note that entry box 302 may be an entry box in a web page (e.g., as shown in FIG. 8), in a tool bar (e.g., a Yahoo!® Toolbar, Google® Toolbar, etc.), or other search query input entry box. In alternative embodiments, search assistance list 810 may be displayed in a different location in or relative to web page 800. In an embodiment, web address 806 may be configured to appear first (e.g., at the top) of search assistance list 810 in drop down window 802. Any number of suggested search queries may be included in list 808 in drop down window 802. In an embodiment, the user may be enabled to scroll up and down through search assistance list 810, and may be enabled to select (e.g., click on) any one of selected web address 806 or a suggested search query in list 808, to either proceed directly to the web page corresponding to web address 806 or to perform a search on the suggested search query (to generate a corresponding search results page).

Figure 9:
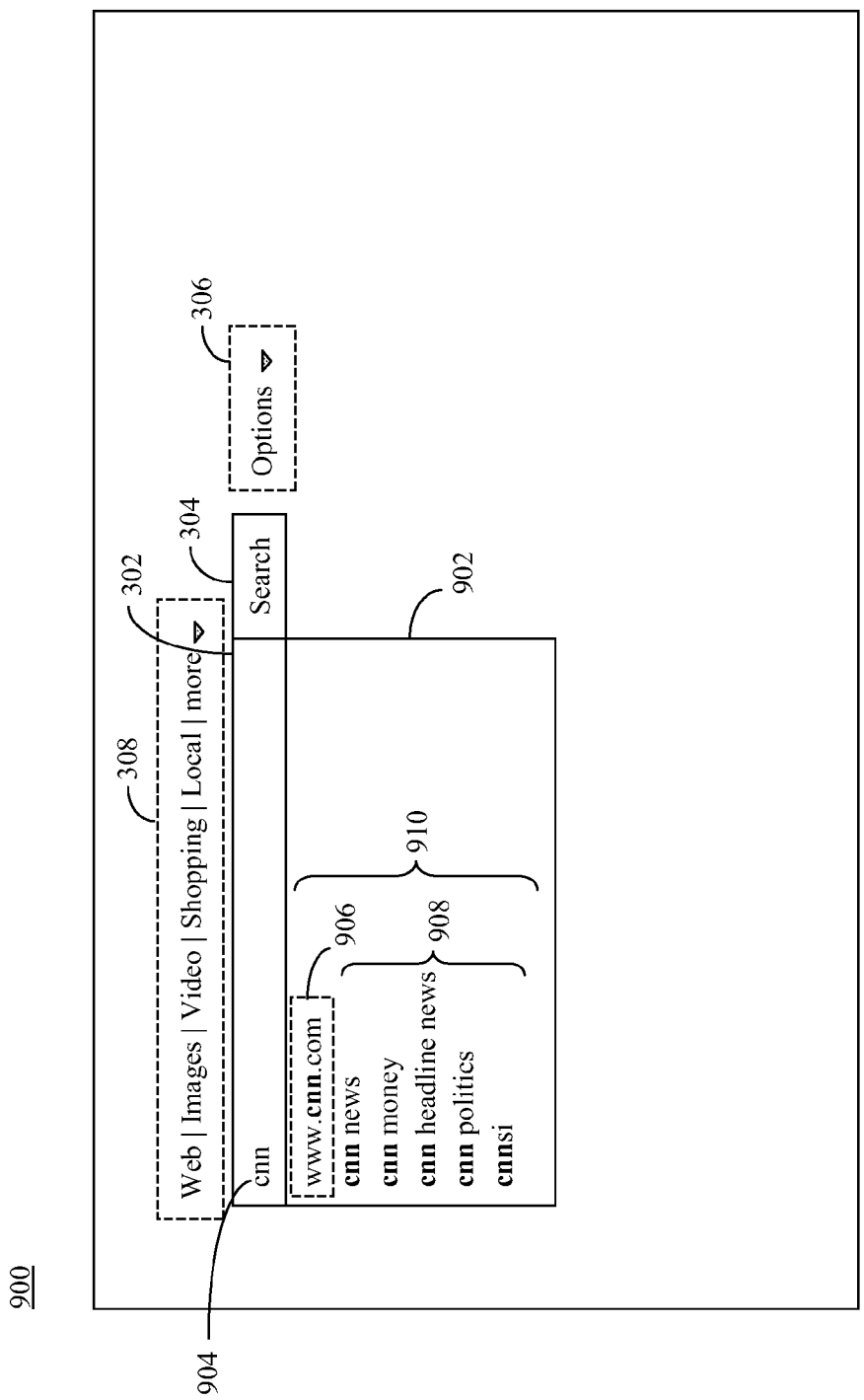
FIG. 9 shows the search interface of FIG. 8 with the example search query "cnn" entered into the search query entry box, according to an embodiment of the present invention.

FIG. 9 shows a web page 900 that is an example of web page 800 shown in FIG. 8, according to the current example. As shown in FIG. 9, a partial search query 904 of "cnn" is entered in entry box 302. As a result, a drop down window 902 is generated that provides a search assistance list 910. Search assistance list 910 includes the selected web address 906 of "www.cnn.com" generated by navigational query determiner 506, and a list 908 of suggested search queries (e.g., "cnn news," "cnn money," "cnn headline news," "cnn politics," and "cnnsi") generated by suggested search manager 504. If desired, the user may click on "www.cnn.com" in window 902 to navigate directly to the website www.cnn.com. Alternatively, the user may click on one of the suggested search queries in list 908 to cause search engine 502 to perform a search and provide a search results page to the user, or the user may enter further characters in entry box 302 to modify/complete the partial search query (which may lead to the display of a modified search assistance list generated by suggested search manager 504 and navigational query determiner 506 based on the modified search query, as described above).

B. Example Suggested Search Query Selector Embodiments

Figure 10:
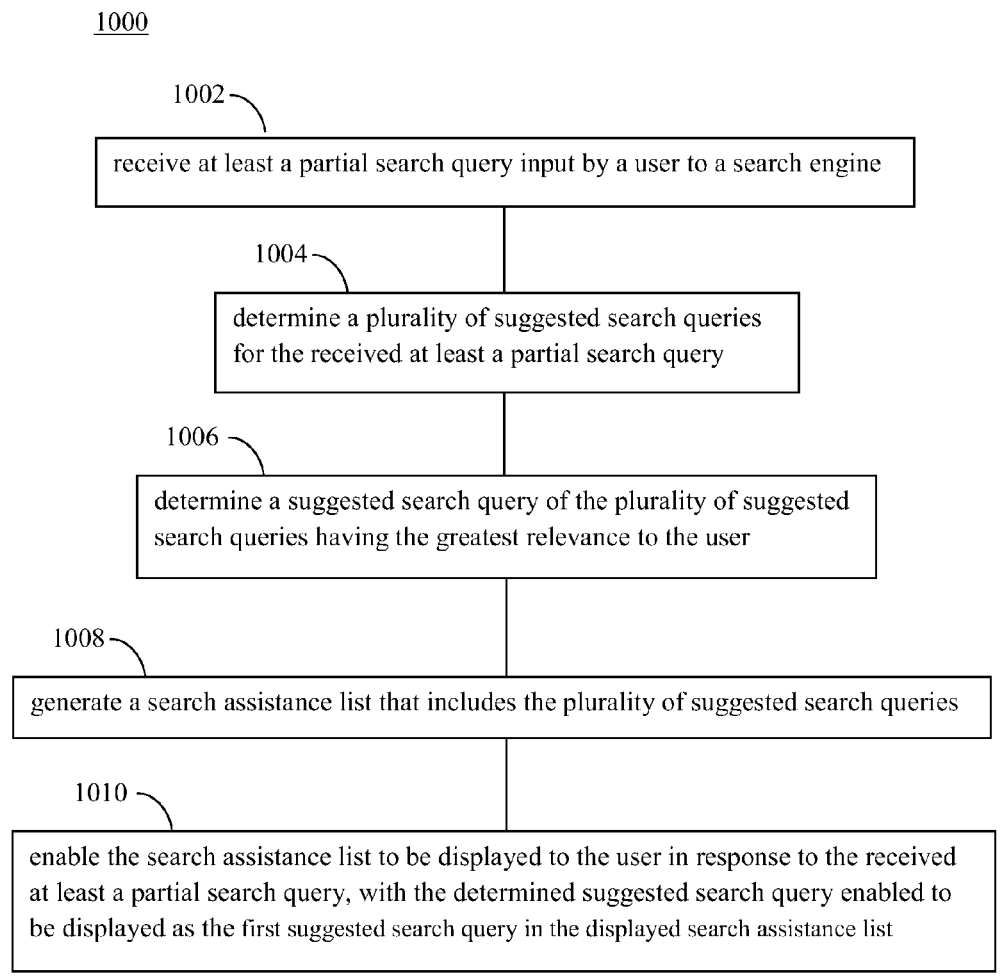
FIG. 10 shows a flowchart for providing search assistance, according to an example embodiment of the present invention.

Suggested search query selector 506 shown in FIG. 5 may be implemented in various ways to perform its functions. For instance, FIG. 10 shows a flowchart 1000 for providing search assistance, according to an embodiment of the present invention. Flowchart 1000 may be performed by suggested search query selector 506, for example. Further structural and operational embodiments will be apparent to persons skilled in the relevant art(s) based on the discussion regarding flowchart 1000. For illustrative purposes, flowchart 1000 is described with reference to FIG. 11, which shows a portion of system 500 of FIG. 5. Flowchart 1000 is described as follows.

Figure 11:
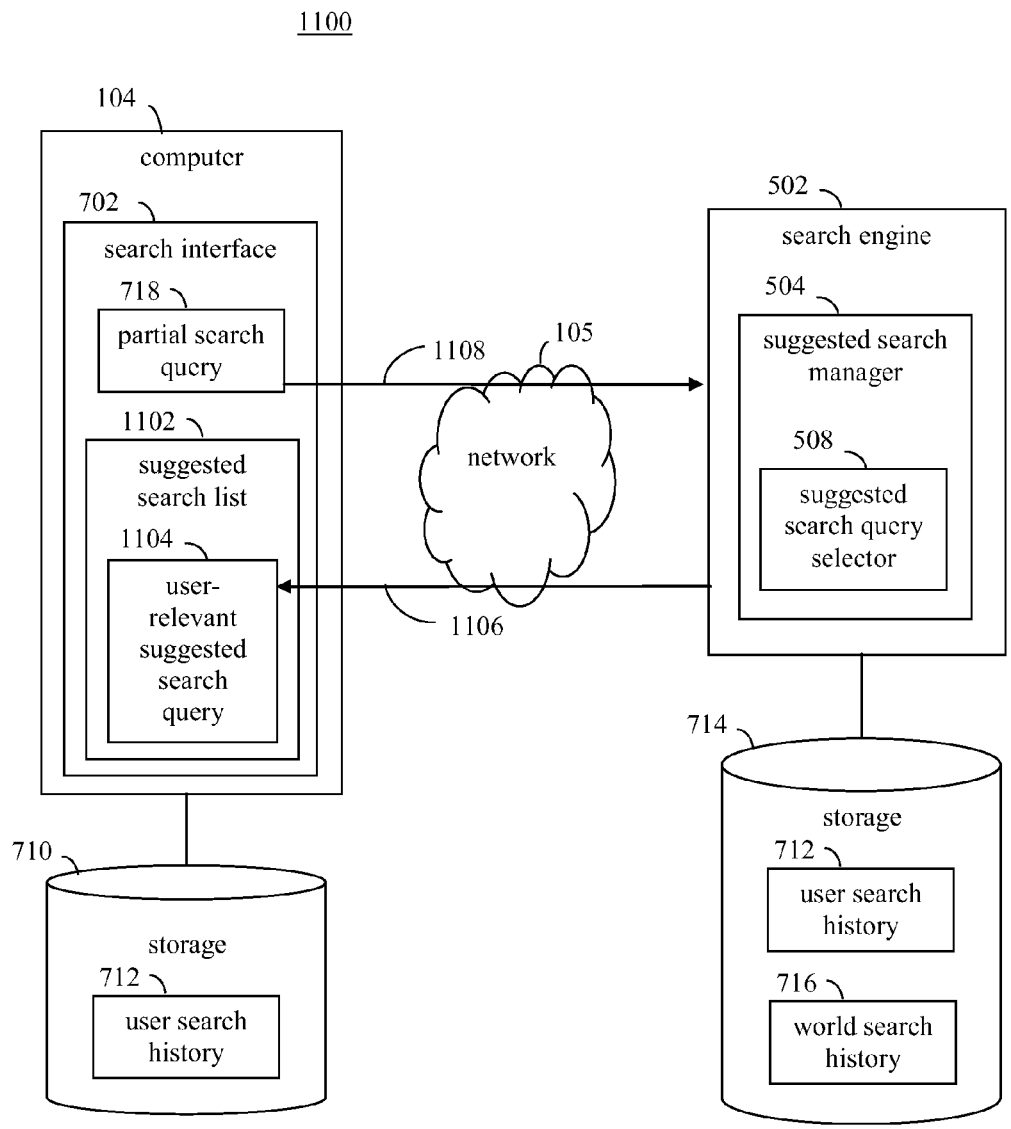
FIG. 11 shows a portion of the system of FIG. 5, where a suggested search query that is relevant to a user is determined, according to an example embodiment of the present invention.

Flowchart 1000 begins with step 1002. In step 1002, at least a partial search query input by a user to a search engine is received. For example, as shown in FIG. 11, partial search query 718 is input by a user into search interface 702 at computer 104. As described above, search interface 702 may be a web page (e.g., web page 300 of FIG. 3) having a search query entry box, a web browser search engine tool bar plug-in, or any other type of interface for enabling search engine queries to be received. Partial search query 718 may be any number of one or more characters of a search query being entered into search interface 702 by the user. As shown in FIG. 7, partial search query 718 is transmitted from search interface 702 to search engine 502 through network 105 in a first communication signal 706. In an embodiment, each time the user enters a character or otherwise edits partial search query 718, partial search query 718 may be retransmitted to search engine 502.

In step 1004, a plurality of suggested search queries for the received at least a partial search query is determined. As shown in FIG. 11, search engine 502 receives first communication signal 1108, which includes partial search query 718. As described above with respect to FIG. 4, suggested search manager 110 is configured to generate list 406, which includes one or more suggested search queries based on the received characters of a search query. In a similar manner, in FIG. 11, suggested search manager 504 is configured to generate a search assistance list that includes one or more suggested search queries.

For instance, partial search query 718 received in step 1002 may be the characters "cnn." Suggested search manager 504 may determine a plurality of suggested search queries for "cnn." Suggested search manager 504 may access world search history 712 stored in storage 714 to determine the suggested search queries. For example suggested search manager 504 may determine the following suggested search queries for "cnn," listed in order of decreasing popularity (e.g., based on number of clicks) among users having search history tracked in world search history 716: "cnn news," "cnn money," "cnn headline news," "cnn politics," "cnnsi," and "cnn sports."

In step 1006, a suggested search query of the plurality of suggested search queries having the greatest relevance to the user is determined. In an embodiment, suggested search query selector 508 may be configured to determine a suggested search query of the suggested search queries (determined in step 1004) of highest relevance to the user. For example, suggested search query selector 508 may determine the suggested search query based on a search history of the user. For instance, user search history 712 shown in FIG. 11 (stored in storage 710 coupled to computer 104 or stored in storage 714 coupled to search engine 502) may be accessed by suggested search query selector 508 to determine the suggested search query of highest relevance to the user. For instance, information stored in user search history 712 in storage 710 (coupled to computer 104) may be transmitted through network 105 to search engine 502 to be processed by suggested search query selector 508. Alternatively, suggested search query selector 508 may access user search history 712 stored in storage 714 coupled to search engine 502.

Suggested search query selector 506 may compare partial search query 718 to user search history 712 to determine the suggested search query that has the highest relevance to the user. Table 3 shown below is a reproduction of the contents of user search history 712 shown in Table 1 above, and is referred to with regard to the current example:

TABLE 3

| search query | clicked web page | number of clicks |
| --- | --- | --- |
| cnn | www.cnn.com | 8 |
| cnn | sportsillustrated.cnn.com | 1 |
| cnn politics | www.cnn-politics.com | 3 |
| cnn sports | sportsillustrated.cnn.com | 2 |
| shoes | www.zappos.com | 3 |
| shoes | www.payless.com | 2 |
| food | www.wholefoodsmarket.com | 1 |

In the current example, two of the suggested search queries determined in step 1004 ("cnn news," "cnn money," "cnn headline news," "cnn politics," "cnnsi," and "cnn sports") are present in Table 3—"cnn politics" and "cnn sports." In an embodiment, suggested search query selector 506 may be configured to select the suggested search query of "cnn politics," and "cnn sports" having the highest number of clicks by the user to be the suggested search query of highest relevance to the user. In the current example, "cnn politics" has three clicks by the user, and "cnn sports" has two clicks by the user. Thus, suggested search query selector 506 may select "cnn politics" as the most relevant suggested search query to the user.

In step 1008, a search assistance list is generated that includes the plurality of suggested search queries. As described above with respect to FIG. 4, suggested search manager 110 is configured to generate list 406, which includes one or more suggested search queries based on the received characters of a search query. In a similar manner, suggested search manager 504 is configured to generate a search assistance list that includes the one or more suggested search queries determined in step 1004. In the current example, the generated search assistance list includes "cnn politics" as the most relevant suggested search query to the user.

In step 1010, the search assistance list is enabled to be displayed to the user in response to the received at least a partial search query, with the determined suggested search query enabled to be displayed as the first suggested search query in the displayed search assistance list. For example, in an embodiment, the search assistance list (including the suggested search query determined in step 1006 to be most relevant to the user) may be transmitted from search engine 502 through network 105 to computer 104 in a second communication signal 1106.

Note that as described above, in an embodiment, each time the user enters a character, or otherwise edits/modifies partial search query 718 at computer 104, partial search query 718 may be transmitted from search interface 702 to search engine 502 as edited/modified, and search engine 502 may generate and transmit a revised/modified search assistance list back to computer 104 (e.g., by repeating/re-performing steps 1004-1010 based on the modified partial search query).

Figure 12:
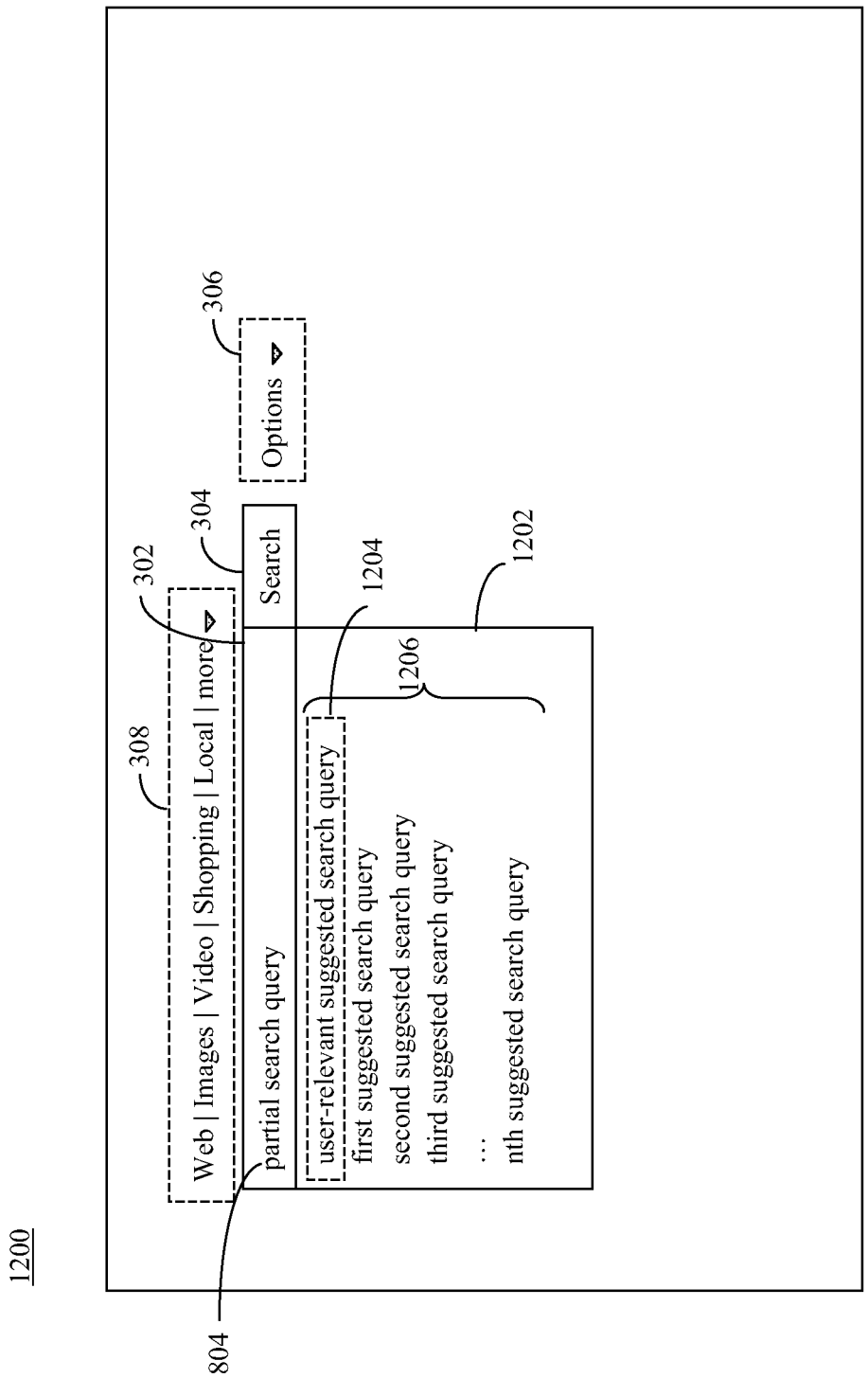
FIG. 12 shows a search interface that includes a search query entry box, and shows a drop down search assistance window, according to an example embodiment of the present invention.

In an embodiment, the search assistance list may be displayed to the user by search interface 702 at computer 104. For example, FIG. 12 shows a web page 1200, where the user has entered partial search query 804 in entry box 302. Web page 1200 is an example of search interface 702 shown in FIG. 11. As a result of entering partial search query 804 into entry box 302, suggested search manager 504 generates a list of suggested search queries (step 1004), similar to list 808 shown in FIG. 8. Suggested search query selector 508 determines user-relevant suggested search query 1204, which is a suggested search query of the list determined to have a highest relevance to the user (step 1006). Suggested search manager 504 generates a search assistance list 1206 that includes the suggested search queries, with user-relevant suggested search query 1204 positioned at a prominent location (e.g., at the top of list 1206).

Search assistance list 1206 is transmitted to the user (e.g., in second communication signal 1106). As shown in FIG. 12, search assistance list 1206 is displayed in a drop down window 1202, which appears below entry box 302. In alternative embodiments, search assistance list 1206 may be displayed in a different location in web page 1200. In embodiments, user-relevant suggested search query 1204 may be configured to appear first (e.g., at the top) of search assistance list 1206 in drop down window 1202, or in a different prominent location. Any number of suggested search queries may be included in list 1206 in drop down window 802. In an embodiment, the user may be enabled to scroll up and down through search assistance list 1206, and may be enabled to select (e.g., click on) any one of user-relevant suggested search query 1204 or another suggested search query in list 1206 to perform a search on the selected suggested search query (to generate a corresponding search results page).

Figure 13:
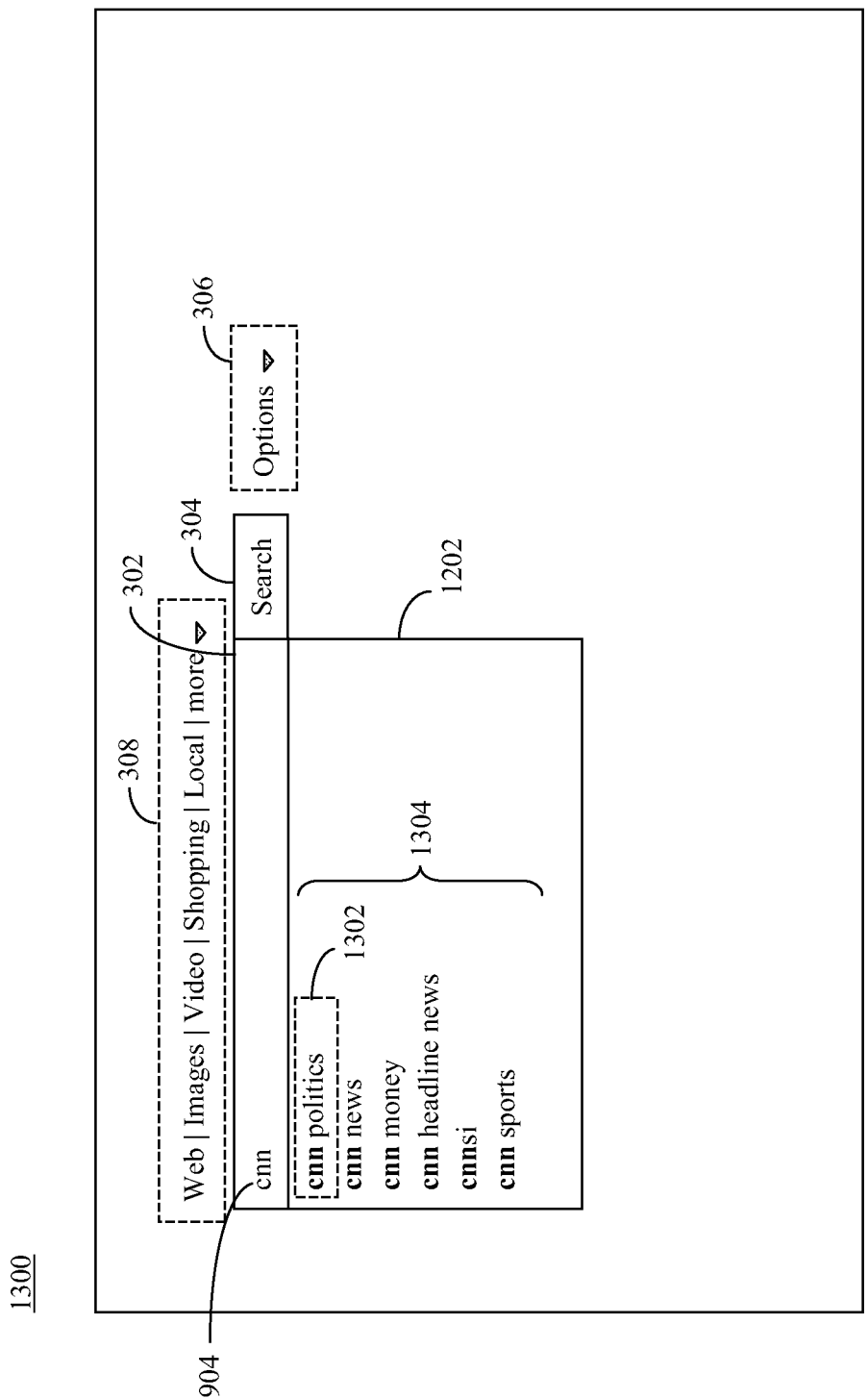
FIG. 13 shows the search interface of FIG. 12 with the example search query "cnn" entered into the search query entry box, according to an embodiment of the present invention.

FIG. 13 shows a web page 1300 that is an example of web page 1200 shown in FIG. 12, according to the current example. As shown in FIG. 13, a partial search query 904 of "cnn" is entered in entry box 302. As a result, a drop down window 1202 is generated that provides a search assistance list 1304. Search assistance list 1304 includes the user-relevant suggested search query 1302 of "cnn politics" generated by suggested search query selector 506. Query 1302 is located at the top position of a list 1304 of suggested search queries that includes "cnn news," "cnn money," "cnn headline news," "cnnsi," and "cnn sports." If desired, the user may click on "cnn politics" to submit a search on the search query "cnn politics." Alternatively, the user may click on one of the other suggested search queries in list 1304 to cause search engine 502 to perform a corresponding search.

C. Further Example Embodiments

Note that the example embodiments described above for selecting a web address (e.g., web address 722 shown in FIG. 7) to provide to the user based on a predicted navigational query are described in the context of selecting a single web address. In further embodiments, multiple web addresses (e.g., more than one web address 722) may be selected to be provided to the user in a search assistance list. For instance, two or more web pages may be frequently navigated to by a user in response to the user submitting a particular query. The two or more web pages may be navigated to by the user more than other web pages by a predetermined number of clicks, by a predetermined percentage of clicks, etc. If navigational query determiner 506 predicts that a received query is a navigational query, navigational query determiner 506 may select the web addresses of the two or more web pages to be displayed to the user in a search assistance list.

Furthermore, the example embodiments described above for selecting user-relevant suggested search queries to provide to the user (e.g., user-relevant suggested search query 1104 shown in FIG. 11) are described in the context of selecting a single user-relevant suggested search query. In further embodiments, multiple user-relevant suggested search queries (e.g., more than one user-relevant suggested search query 1104) may be selected to be provided to the user in a search assistance list. For instance, two or more suggested search queries may be frequently selected by a user from a list of suggested search queries. The two or more suggested search queries may be selected by a user more frequently than others by a predetermined number of clicks, by a predetermined percentage of clicks, etc. As a result, suggested search query selector 508 may select the two or more suggested search queries to be displayed to the user at prominent positions (e.g., top positions) in a search assistance list.

III. Example Computer System Implementations

In an embodiment, search engine 502, suggested search manager 504, navigational query determiner 506, and suggested search query determiner 508 may implemented in one or more computers, including a server, a personal computer, a mobile computer (e.g., a laptop computer, a notebook computer, a handheld computer such as a personal digital assistant (PDA) or a Palm™ device, etc.), a mobile phone (e.g., a cell phone, a smart phone, etc.), or a workstation. These example devices are provided herein purposes of illustration, and are not intended to be limiting. Embodiments of the present invention may be implemented in further types of devices, as would be known to persons skilled in the relevant art(s).

A device in which an embodiment is implemented may include a display device, such as a CRT monitor, an LCD (liquid crystal display), a plasma display, and/or any other type of display device. The display device may be used to display the web pages, search assistant lists, selected web addresses, suggested queries, and/or other textual and/or graphical features described herein.

Devices in which embodiments may be implemented may include storage, such as storage drives, memory devices, and further types of computer-readable media. Examples of such computer-readable media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable media may store program modules that include logic for implementing search engine 502, suggested search manager 504, navigational query determiner 506, suggested search query determiner 508, flowchart 600 shown in FIG. 6, flowchart 1000 shown in FIG. 10, and/or further embodiments of the present invention described herein. Embodiments of the invention are directed to computer program products comprising such logic (e.g., in the form of software) stored on any computer useable medium. Such software, when executed in one or more data processing devices, causes a device to operate as described herein.

IV. Conclusion

While various embodiments of the present invention have been described above, it should be understood that they have been presented by way of example only, and not limitation. It will be apparent to persons skilled in the relevant art(s) that various changes in form and details may be made to the embodiments described above without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for providing search assistance, comprising:
receiving at least a partial search query input by a user to a search engine;
predicting that the received at least a partial search query is a navigational query input by the user to navigate to a particular website, said predicting including identifying a plurality of search queries in a history of search queries that include the received at least a partial search query, and comparing click-related data values of clicked web pages associated with the identified search queries to determine that the received at least a partial search query is a navigational query;
selecting a web address based on the predicted navigational query, the selected web address being a web address for a clicked web page associated with a search query of the identified search queries determined to be a navigational query by said comparing;
generating a search assistance list that includes the selected web address; and
enabling the search assistance list to be displayed to the user in response to the received at least a partial search query.

2. The method of claim 1, wherein said predicting comprises:
determining that the received at least a partial search query is a navigational query if a web page associated with a search query of the identified one or more search queries has a click through rate that is greater than click through rates of other web pages associated with the identified one or more search queries by a predetermined amount.

3. The method of claim 2, wherein the history of search queries is a search history of the user.

4. The method of claim 2, wherein the history of search queries is a search history of a plurality of users.

5. The method of claim 1, wherein said generating the search assistance list that includes the selected web address comprises:
configuring the search assistance list such that the selected web address is configured to be listed first in a display of the search assistance list to the user.

6. The method of claim 5, wherein said enabling comprises:
transmitting the search assistance list to a computer of the user.

7. The method of claim 6, wherein the at least a partial search query is received in the search query entry box, the method further comprising:
enabling the user to modify the at least a partial search query in the search query entry box.

8. The method of claim 7, further comprising:
receiving the modified at least a partial search query;
re-performing said predicting, said selecting, and said generating based on the received modified at least a partial search query to generate a modified search assistance list; and
displaying the modified search assistance list to the user in the drop down list under the search query entry box.

9. A method for providing search assistance, comprising:
receiving at least a partial search query input by a user to a search engine;
predicting that the received at least a partial search query is not a navigational query, said predicting including identifying a plurality of search queries in a history of search queries that include the received at least a partial search query, and comparing click-related data values of clicked web pages associated with the identified search queries to determine that the received at least a partial search query is not a navigational query;
determining a plurality of suggested search queries for the received at least a partial search query;
determining a suggested search query of the plurality of suggested search queries having a greatest relevance to the user, including analyzing a search history of the user to determine a suggested search query of the plurality of suggested search queries having a highest number of clicks by the user;
generating a search assistance list that includes the plurality of suggested search queries; and
enabling the search assistance list to be displayed to the user in response to the received at least a partial search query, with the determined suggested search query enabled to be displayed as the first suggested search query in the displayed search assistance list.

10. The method of claim 9, wherein said enabling comprises:
transmitting the search assistance list to a computer of the user.

11. The method of claim 9, wherein said enabling comprises:
displaying the search assistance list to the user in a drop down list under a search query entry box.

12. The method of claim 11, wherein the at least a partial search query is received in the search query entry box, the method further comprising:
enabling the user to modify the at least a partial search query in the search query entry box.

13. The method of claim 12, further comprising:
receiving the modified at least a partial search query;
re-performing said predicting, said determining a plurality of suggested search queries for the received at least a partial search query, said determining a suggested search query of the plurality of suggested search queries having a greatest relevance to the user, and said generating based on the received modified at least a partial search query to generate a modified search assistance list; and
enabling the modified search assistance list to be displayed to the user in the drop down list under the search query entry box.

14. A system for providing search assistance, comprising:
one or more processors;
a suggested search manager, implemented using at least one of the one or more processors, configured to receive at least a partial search query input by a user to a search engine; and
a navigational query determiner, implemented using at least one of the one or more processors, coupled to the suggested search manager, wherein the navigational query determiner is configured to
identify a plurality of search queries in a history of search queries that include the received at least a partial search query,
compare click-related data values of clicked web pages associated with the identified search queries to predict whether the received at least a partial search query is a navigational query input by the user to navigate to a particular website, and select a web address based on the navigational query if the received at least a partial search query is predicted to be a navigational query, the selected web address being a web address for a clicked web page associated with a search query of the identified search queries determined to be a navigational query by said comparing, wherein the suggested search manager is configured to determine a plurality of suggested search queries for the received at least a partial search query and to determine a suggested search query of the plurality of suggested search queries having a greatest relevance to the user; and the suggested search manager is configured to generate a search assistance list that includes the plurality of suggested search queries, and includes the selected web address if the received at least a partial search query is predicted to be a navigational query, the suggested search manager enabling the search assistance list to be displayed to the user in response to the received at least a partial search query.

15. The system of claim 14, wherein the navigational query determiner is configured to identify one or more search queries in a history of search queries that include the received at least a partial search query, and to determine that the received at least a partial search query is a navigational query if a web page associated with a search query of the identified one or more search queries has a click through rate that is greater than click through rates of other web pages associated with the identified one or more search queries by a predetermined amount;

wherein the navigational query determiner is configured to use a web address of the web page as the selected web address.

16. The system of claim 15, wherein the history of search queries is a search history of the user.

17. The system of claim 16, wherein the search history of the user is stored at a computer of the user.

18. The system of claim 15, wherein the history of search queries is a search history of a plurality of users that is stored in storage coupled to the suggested search manager.

19. The system of claim 14, wherein the suggested search manager is configured to configure the search assistance list such that the selected web address is configured to be listed first in a display of the search assistance list to the user.

20. The system of claim 14, wherein the search assistance list is configured to be transmitted to a computer of the user to be displayed to the user in a drop down list under a search query entry box.

* * * * *